US006556376B1

(12) United States Patent
Boutaghou

(10) Patent No.: US 6,556,376 B1
(45) Date of Patent: *Apr. 29, 2003

(54) INTEGRAL HUB AND DISK CLAMP FOR A DISK DRIVE STORAGE DEVICE

(75) Inventor: Zine-Eddine Boutaghou, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/094,067

(22) Filed: Jun. 9, 1998

Related U.S. Application Data

(62) Division of application No. 08/703,621, filed on Aug. 27, 1996, which is a continuation of application No. 08/464,494, filed on Jun. 5, 1995, which is a division of application No. 08/322,716, filed on Oct. 12, 1994, now Pat. No. 5,486,962.

(51) Int. Cl.[7] .............................................. G11B 17/28
(52) U.S. Cl. ..................................... 360/99.12; 369/270
(58) Field of Search .......................... 360/98.07, 98.08, 360/99.04, 99.05, 99.08, 99.12; 369/258, 261, 263, 264, 270, 271, 290

(56) References Cited

U.S. PATENT DOCUMENTS

| | | | |
|---|---|---|---|
| 4,358,843 A | 11/1982 | Rager | 369/261 |
| 4,585,963 A | 4/1986 | Wilkinson, Jr. et al. | 310/67 R |
| 4,788,464 A | 11/1988 | Nishikawa et al. | 310/268 |
| 4,791,624 A | 12/1988 | Stinesen | 369/270 |
| 4,823,337 A | 4/1989 | VanZanten et al. | 369/270 |
| 4,965,476 A | 10/1990 | Lin | 310/51 |
| 5,014,143 A | 5/1991 | Mori et al. | 369/270 |
| 5,048,005 A | 9/1991 | Ekhoff | 369/270 |
| 5,105,871 A | 4/1992 | Baud et al. | 160/310 |
| 5,157,295 A | 10/1992 | Stefansky et al. | 310/90 |
| 5,166,920 A | 11/1992 | Kogure | 369/270 |
| 5,193,084 A | 3/1993 | Christiaens | 369/270 |
| 5,243,481 A | 9/1993 | Dunckley et al. | 360/99.08 |
| 5,303,098 A | 4/1994 | Yamamori et al. | 360/99.12 |
| 5,384,677 A | 1/1995 | Morehouse et al. | 360/99.12 |
| 5,486,962 A | 1/1996 | Boutaghou | 369/270 |
| 5,501,760 A | 3/1996 | Mukawa | 369/270 |
| 5,555,233 A | 9/1996 | Yano et al. | 369/270 |
| 5,774,445 A * | 6/1998 | Sawi et al. | 369/270 |

FOREIGN PATENT DOCUMENTS

| | | |
|---|---|---|
| EP | 0613134 | 8/1994 |
| JP | 59058678 | 4/1984 |
| JP | 60237672 | 11/1985 |
| JP | 2121154 | 5/1990 |
| JP | 2252180 | 10/1990 |
| JP | 3078456 | 4/1991 |
| JP | 5101524 | 4/1993 |
| JP | 7105607 | 4/1995 |
| WO | 9306600 | 4/1993 |

* cited by examiner

Primary Examiner—Brian E. Miller
(74) Attorney, Agent, or Firm—Roy W. Truelson

(57) ABSTRACT

A disk drive contains an integrally-formed one-piece hub, clamp and rotor housing, which is preferably injection-molded plastic. In the preferred embodiment, the hub includes a hollow cylindrical portion for surrounding a set of bearings mounted on a central shaft, and a flange portion extending from the middle of the cylinder and supporting a single disk. Compliant clamping fingers on the upper surface of the flange engage the disk through its central hole. The fingers are inclined slightly outward, and include a pawl at the end of each finger. During assembly, the disk is forced over the pawls of the fingers until they engage the disk. The fingers, being slightly elastic, will deform to permit the disk to slide over the pawls, and then return to lock the disk in place. The fingers automatically center the disk about the hub axis, without the need for centering tools. The hub also serves as a housing for the rotor of a spindle motor which rotates the disk. A back iron ring and permanent magnets are attached to the underside of the flange at its outer edge to form the rotor. An electromagnetic stator assembly surrounds the disk axis in the annular space defined by the flange, the permanent magnets and back iron at the outer edge, and the cylindrical portion of the hub at the inner edge.

10 Claims, 8 Drawing Sheets

INTEGRAL HUB AND DISK CLAMP FOR A DISK DRIVE STORAGE DEVICE

RELATED APPLICATIONS

This is a divisional application of U.S. patent application Ser. No. 08/703,621 filed Aug. 27, 1996, which is a continuation application of U.S. patent application Ser. No. 08/464,494, filed Jun. 5, 1995, which is a divisional application of U.S. patent application Ser. No. 08/322,716, filed Oct. 12, 1994, now issued as U.S. Patent No. 5,486,962, all of which are herein incorporated by reference.

FIELD OF THE INVENTION

The present invention relates to disk drive data storage devices, and in particular to disk and hub assemblies used in disk drive storage devices.

BACKGROUND OF THE INVENTION

The extensive data storage needs of modern computer systems require large capacity mass data storage devices. A common storage device is the rotating magnetic disk drive.

A disk drive typically contains one or more smooth, flat disks which are rigidly attached to a common spindle. The disks are stacked on the spindle parallel to each other and spaced apart so that they do not touch. The disks and spindle are rotated in unison at a constant speed by a spindle motor.

Each disk is formed of a solid disk-shaped base or substrate, having a hole in the middle for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disks in the magnetizable layer. To do this, minute magnetized patterns representing the data are formed in the magnetizable layer. The data patterns are usually arranged in circular concentric tracks. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle.

There is one transducer head for each disk surface containing data. The transducer head is an aerodynamically shaped block of material (usually ceramic) on which is mounted a magnetic read/write transducer. The block, or slider, flies above the surface of the disk at an extremely small distance as the disk rotates. The close proximity to the disk surface is critical in enabling the transducer to read from or write to the data patterns in the magnetizable layer. Several different transducer designs are used, and in some cases the read transducer is separate from the write transducer.

The actuator usually pivots about an axis to position the head. It typically includes a solid block near the axis having comb-like arms extending toward the disk, a set of thin suspensions attached to the arms, and an electromagnetic motor on the opposite side of the axis. The transducer heads are attached to the suspensions, one head for each suspension. The actuator motor rotates the actuator to position the head over a desired data track. Once the head is positioned over the track, the constant rotation of the disk will eventually bring the desired sector adjacent the head, and the data can then be read or written.

As computer systems have become more powerful, faster, and more reliable, there has been a corresponding increase in demand for improved storage devices. These desired improvements take several forms. It is desirable to reduce cost, to increase data capacity, to increase the speed at which the drives operate, to reduce the electrical power consumed by the drives, and to increase the resilience of the drives in the presence of mechanical shock and other disturbances.

In particular, there is a demand to reduce the physical size of disk drives. To some degree, reduction in size may serve to further some of the above goals. But at the same time, reduced size of disk drives is desirable in and of itself. Reduced size makes it practical to include magnetic disk drives in a range of portable applications, such as laptop computers, mobile pagers, and "smart cards".

An example of size reduction is the application of the PCMCIA Type II standard to disk drives. This standard was originally intended for semiconductor plug-in devices. With improvements to miniaturization technology, it will be possible to construct disk drives conforming to the PCMCIA Type It standard.

In order to shrink the size of disk drives, every component must be reduced in size as much as possible. Additionally, new designs of existing components must be developed to permit reduced size and make assembly of miniaturized components practical.

One limit on the extent to which a disk drive can be reduced in size is the disk/hub assembly. A conventional disk/hub assembly comprises a cylindrical hub having a flange at the bottom for supporting a disk stack. A motor for rotating the disks is located within the hub. The stack of disks rests on the upper surface of the flange, the hub fitting within corresponding holes of the disks. The individual disks are separated by spacer rings surrounding and adjacent to the hub. A clamping apparatus is attached to the top of the hub and applies a downward force to the disk stack, forcing the bottom disk against the flange and holding the stack in place. Where a disk drive has only a single disk, essentially the same design is used, but the clamping apparatus clamps only the one disk instead of the disk stack. The clamping apparatus is typically a flat steel ring having a formed circular ridge near its outer edge. The flat portion of the ring is attached to the upper surface of the hub with screws, while the ridge portion applies pressure to the disk stack or single disk. Several alternative clamp designs exist, but all involve multiple parts.

The conventional disk drive disk/hub design is not well suited to very small form factor disks, such as the PCMCIA Type II form factor. The hub must be sufficiently large to accommodate the screws. Even where very small screws are used, this requirement adds to the size and weight of the hub. The extremely small parts make assembly difficult. There is difficultly tolerating high mechanical shock of portable applications. The relatively thin disks tend to warp when clamped with sufficient clamping force; even a small warpage can be serious when track widths are being reduced. Finally, although the drive is much smaller, simple scaling down of the size of conventional parts will not result in any significant cost reduction; in fact, it may increase costs. It is desirable to develop an alternative hub/disk assembly which reduces costs and is more suitable to the design requirements of small form factor disk drives.

SUMMARY OF THE INVENTION

It is, therefore, an object of the present invention to provide an enhanced disk drive storage apparatus.

Another object of this invention is to reduce the cost of a disk drive storage apparatus.

Another object of this invention is to provide an enhanced hub/disk assembly for a small form factor disk drive storage device.

Another object of this invention is to provide a reduced cost hub/disk assembly for a small form factor disk drive.

Another object of this invention is to provide a hub/disk assembly having fewer parts.

Another object of this invention is to provide a hub/disk assembly which is easier to fabricate and assemble.

Another object of this invention is to provide a hub/disk assembly having greater resistance to mechanical shock.

Another object of this invention is to provide a hub/disk assembly having reduced distortion of the disk.

A disk for a disk drive is mounted on an integrally-formed one-piece hub, clamp and rotor housing. The hub is preferably formed of molded plastic. In the preferred embodiment, the hub includes a substantially hollow cylindrical portion for surrounding a set of bearings mounted on a central shaft, and a flange portion extending from the cylindrical portion near the middle of the cylinder. The flange supports a single disk, which rests on its upper surface. A plurality of circumferentially spaced compliant clamping fingers extend upward from the upper surface of the flange to engage the disk through its central hole. The fingers are inclined slightly outward, and include a pawl at the end of each finger to engage the disk. The edges of the central hole of the disk are preferably chamfered to improve engagement with the fingers and center the disk. To assemble the disk to the hub, the disk is simply forced over the pawls of the fingers until they engage the chamfered edge. The fingers, being slightly elastic, will deform inward sufficiently to permit the disk to slide over the pawls, and will then return outward to lock the disk in place. The fingers automatically center the disk about the hub axis, without the need for centering tools.

The hub also serves as a housing for the rotor of a spindle motor which rotates the disk. In the preferred embodiment, a brushless DC spindle motor is located under the flange. A back iron ring and permanent magnets are attached to the underside of the flange at its outer edge to form the rotor portion of the motor. An electromagnetic stator assembly surrounds the disk axis in the annular space defined by the flange, the permanent magnets and back iron at the outer edge, and the cylindrical portion of the hub at the inner edge.

DETAILED DESCRIPTION OF THE PREFERRED EMBODIMENT

Figure 1:
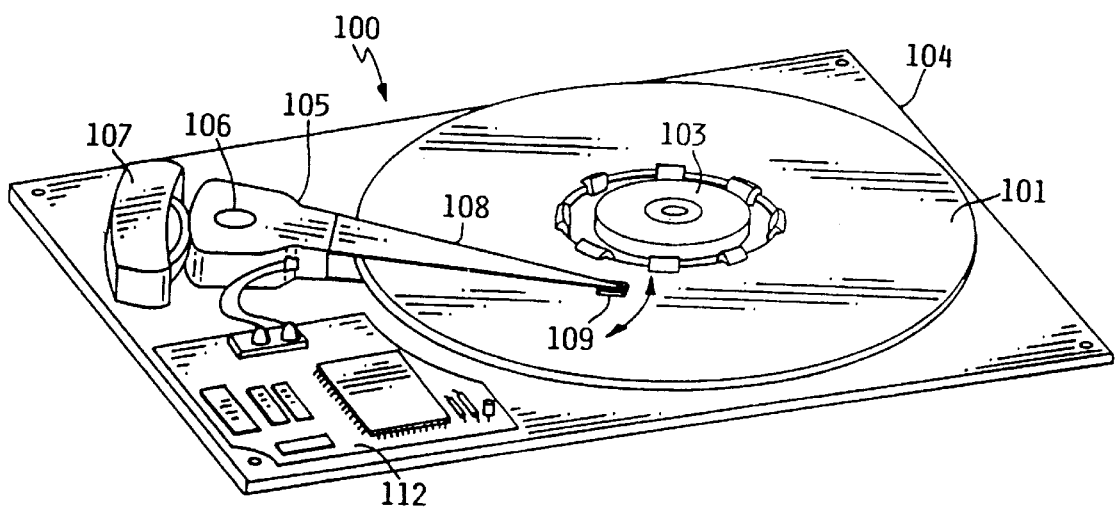
FIG. 1 shows a magnetic disk drive storage unit according to the preferred embodiment.

FIG. 1 shows a magnetic disk drive storage unit 100 in accordance with the preferred embodiment. Disk unit 100 comprises rotatable disk 101, which is rigidly attached to hub 103, which is mounted on disk drive base or housing 104. Hub 103 and disk 101 are driven by a drive motor at a constant rotational velocity. The drive motor is contained within hub 103. Actuator assembly 105 is situated to one side of disk 101. Actuator 105 rotates through an arc about shaft 106 parallel to the axis of disk 101, driven by electromagnetic motor 107, to position the transducer heads. A cover (not shown) mates with base 104 to enclose and protect the disk and actuator assemblies. Electronic modules for controlling the operation of the drive and communicating with another device, such as a host computer, are mounted on a circuit card 112 within the head/disk enclosure formed by base 104 and the cover. In this embodiment, circuit card 112 is mounted within the enclosure and shaped to take up unused space around the disk in order to conserve space, as would be used for a PCMCIA Type II form factor. However, the card 112 could also be mounted outside the head/disk enclosure, or the base itself could be made as a circuit card for mounting electronic modules directly to it. A plurality of head/suspension assemblies 108 are rigidly attached to the prongs of actuator 105. An aerodynamic read/write transducer head 109 is located at the end of each head/suspension assembly 108 adjacent the disk surface.

Hub 103 is a one-piece, integrally-formed part which also contains clamping means for locking disk 101 in place, and which functions as a rotor housing for the drive motor. By "integrally-formed", it should be understood that hub 103 is a uniform material formed as a single solid mass by molding, casting, extruding, or other means, and may be machined, etched, or otherwise shaped as necessary to the required dimensions; hub 103 is not built up from multiple discrete components attached together. In the preferred embodiment, hub 103 is an injection molded polymeric part. Specifically, it is preferred that the polymer be a polyetherimide (PEI), in particular Ultem 7201, which is commercially available from General Electric Corporation. Ultem 7201 is preferred because its coefficient of thermal expansion is close to that of aluminum, the preferred material for disk 101. However, other suitable polymers may be used. Alternatively, it may be possible to use non-polymeric materials, such as aluminum or ceramic.

Figure 2:
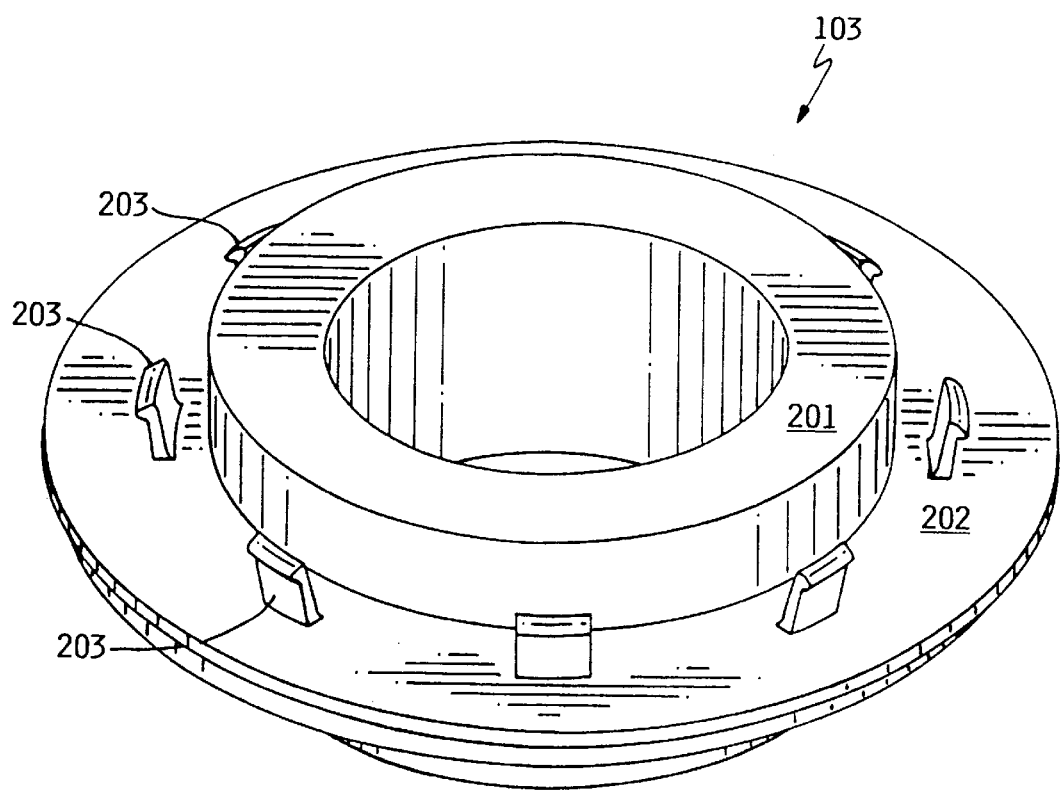
FIG. 2 is an isometric view of an integral hub, clamp and rotor housing according to the preferred embodiment.

FIG. 2 is an isometric view of integral hub, clamp and rotor housing 103 according to the preferred embodiment. Hub 103 preferably includes a hollow cylindrical base portion 201, a relatively flat cylindrical flange portion 202 extending from base portion 201, and a plurality of circumferentially spaced fingers 203 for engaging disk 101 and serving as a clamping means.

Figure 3:
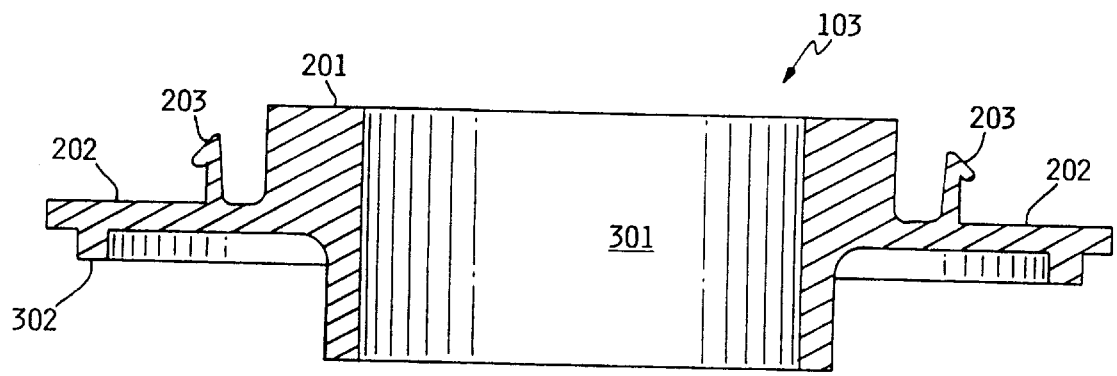
FIG. 3 is a sectional view of the integral hub, clamp and rotor housing according to the preferred embodiment.

FIG. 3 is a sectional view, in the plane of the disk axis, of integral hub, clamp and rotor housing 103 according to the preferred embodiment. As can be seen more clearly in the sectional view of FIG. 3, hollow cylindrical base portion 201 defines a central cylindrical hole 301 for the disk shaft and bearings. Flange portion 202 extends from approximately the middle of base portion 201. A circumferential lip 302 extends downward from the lower surface of flange portion 202, near its outer edge. Lip 302 provides a mating surface and support for a rotor back iron and permanent magnets.

Figure 4:
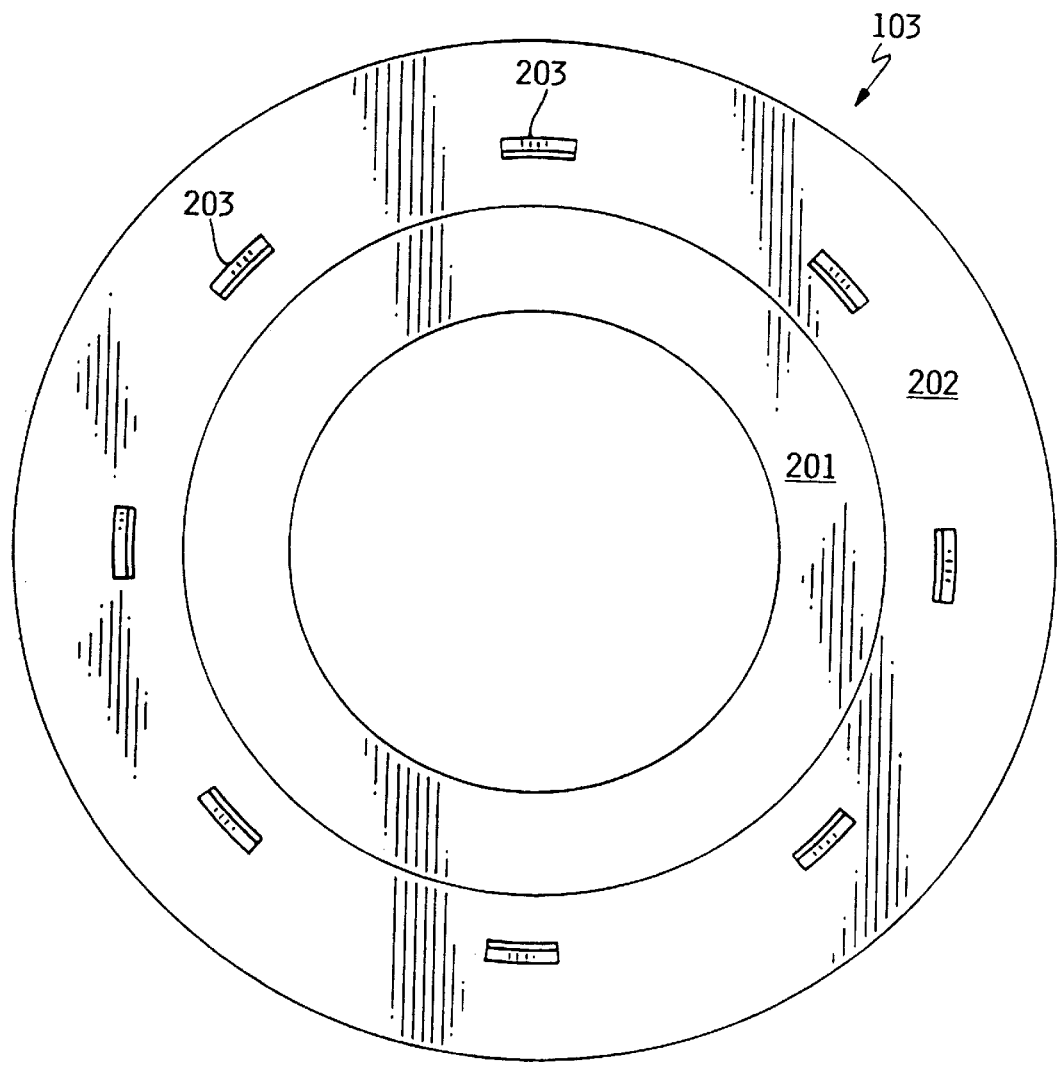
FIG. 4 is a top view of the integral hub, clamp and rotor housing according to an alternative embodiment.

FIG. 4 is a top view of integral hub, clamp and rotor housing 103 according to the preferred embodiment. In the preferred embodiment, hub 103 contains eight equally spaced fingers 203 positioned as shown, it being understood that the number and size of the fingers may vary, and that other integral clamping means may be used within the spirit and scope of the present invention.

Figure 5:
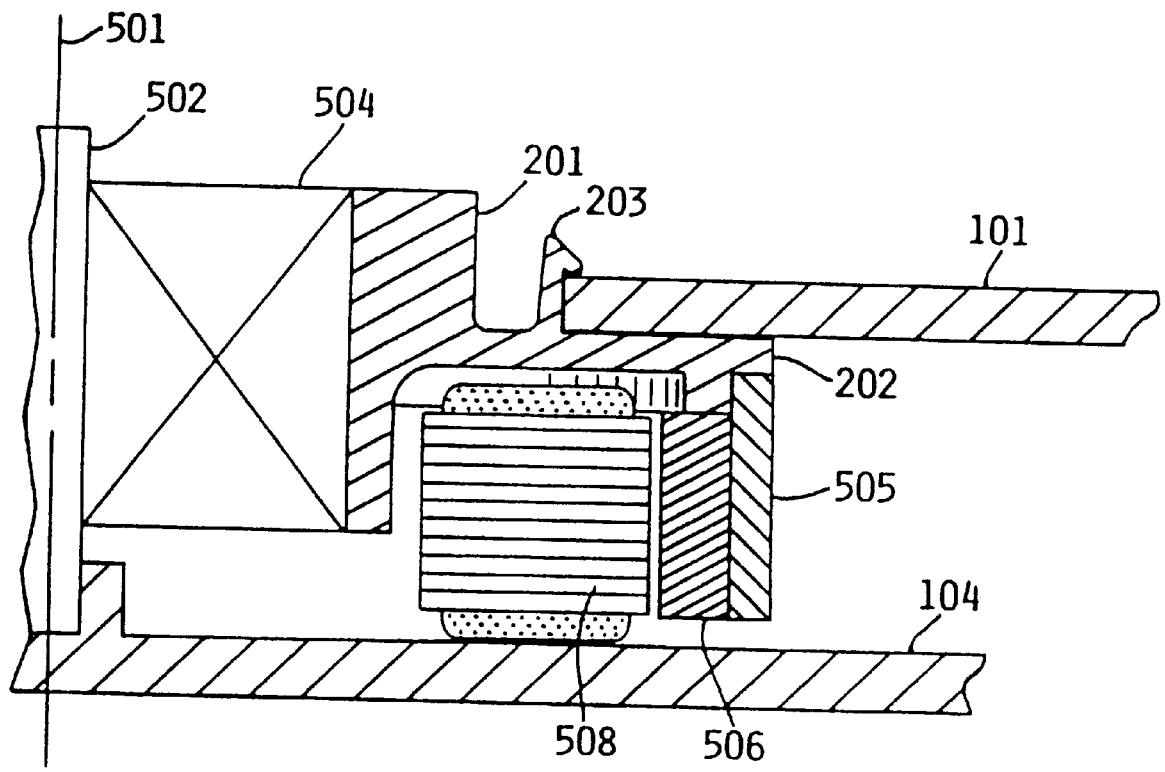
FIG. 5 is a half-sectional view of a hub and disk assembly according to the preferred embodiment.

FIG. 5 shows in greater detail hub 103 and related hardware, including components of the spindle motor, when assembled, in accordance with the preferred embodiment. FIG. 5 is a half sectional view, taken in the plane of the axis of rotation of the disks. While hub 103 and related components on only one side of the axis are depicted in FIG. 5, it should be understood that these are symmetrical about the axis.

Disk shaft 502 is rigidly attached to base 104 of the disk drive. Shaft 502 is preferably steel. Disk axis 501 runs through the center of shaft 502. Hub cylindrical portion 201 is mounted on bearing assembly 504 for rotation about axis 501. Bearing assembly preferably comprises two sets of preloaded ball bearings in sealed bearing races, at opposite ends of shaft 502. However, bearing assembly could alternatively be a fluid (hydrodynamic) or other type of bearing. In another alternative, portions of bearing assembly 504 may be integrally formed with hub 103, as for example by forming a fluid bearing surface on the inner surface of hub cylindrical portion 201.

Flange portion 202 of hub 103 extends outward from cylindrical base portion 201 at approximately the middle of its length. Disk 101 rests on the upper surface of flange portion 202, the flange supporting disk 101 from below. Multiple identical circumferentially spaced fingers 203 protrude from the upper surface of flange 202 to engage disk 101 and lock it in place, thus serving as a clamping means and obviating the need for a separately attached clamp.

Back iron 505 and set of permanent rotor magnets 506 for a brushless DC spindle motor are attached to the underside of flange portion 202 at the outer edge. Back iron 505 is a ring of magnetically permeable material, preferably an Fe-Pb alloy. Back iron 505 may also be a wound series of laminations forming a ring. Magnets 506 are preferably a solid ring of suitable magnetizable material, in which successive arcuate segments are magnetized to alternating magnetic polarity. Magnets 506 thus form a set of permanent arcuate magnets, circumferentially arranged about the disk axis to completely encircle the axis, having alternating polarity.

Circumferential lip 302 provides support for back iron 505 and magnets 506. Back iron 505 is preferably bonded to hub 103 at lip 302 and lower surface of flange 202 using a suitable adhesive. Alternatively, it may be attached to hub 103 during the injection molding process by inserting back iron 505 in the mold cavity and molding hub 103 over back iron 505. Permanent magnets 506 are preferably bonded directly to back iron 505 using a suitable adhesive.

Spindle motor electromagnetic stator 508 is attached to base 104 and positioned underneath flange 202, within the annular space defined by cylindrical base portion 201 at the inner radius and back iron 505 and magnets 506 at the outer radius. Stator 508 comprises a set of circumferentially spaced electromagnets (poles) surrounding the disk axis, each pole comprising a wire coil wrapped around a magnetically permeable core. Stator 508 is connected to motor drive electronics (not shown) on circuit card 112. In operation, the motor drive electronics sequentially pulse different poles of stator 508 to generate a rotating electromagnetic field, as is known in the art. In the preferred embodiment, stator 508 is a 3-phase stator having three poles in each phase (total of nine poles), and rotor magnet set 506 comprises twelve magnetic pole segments. However, the number of stator and rotor poles may vary.

Figure 6:
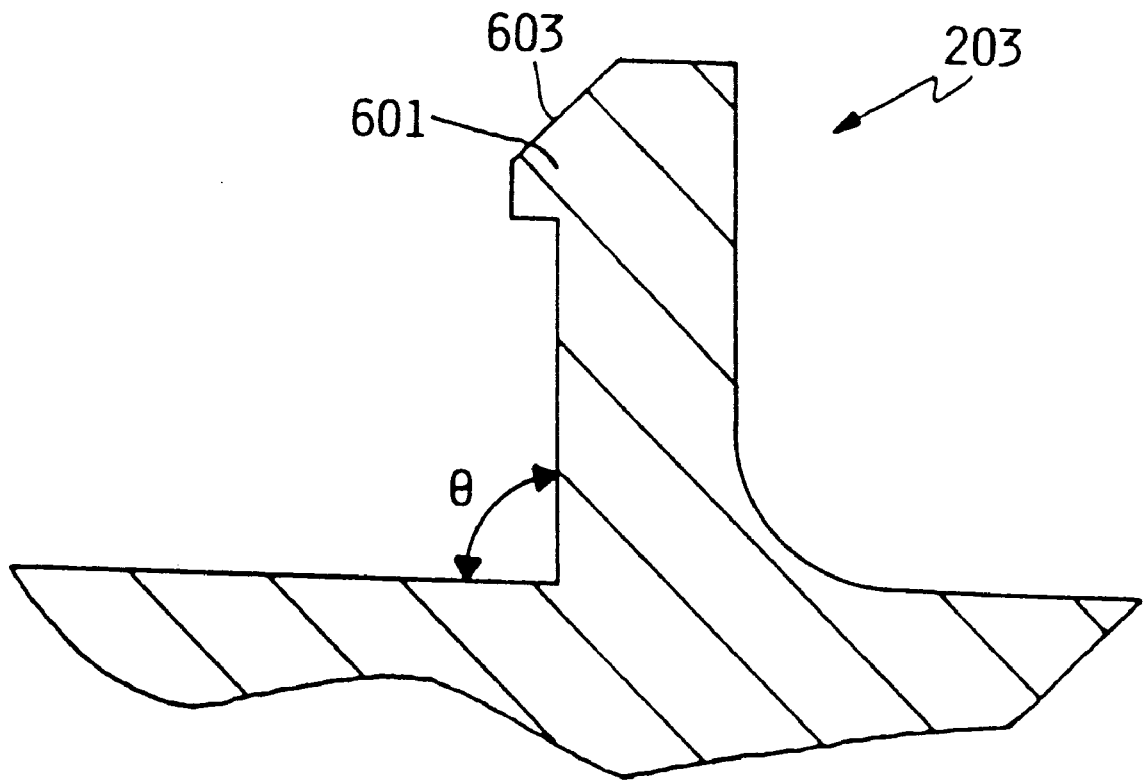
FIG. 6 is a sectional view of a clamping finger portion of the integral hub, clamp and rotor housing, according to the preferred embodiment.

FIG. 6 is a sectional view in the plane of the disk axis of a clamping finger 203, showing the finger in greater detail. Finger 203 is molded with a slight outward inclination to apply a small radial force to the inner hole of disk 101. Preferably, the angle of inclination is approximately 3 degrees, i.e. the angle θ in FIG. 6 is approximately 87 degrees, it being understood that the optimum angle will vary with the thickness of the finger and type of material selected. Near the end of finger 203 is a pawl 601 for engaging disk 101. Pawl 601 contains chamfered top edge 603 to enable assembly of the disk.

Figure 7:
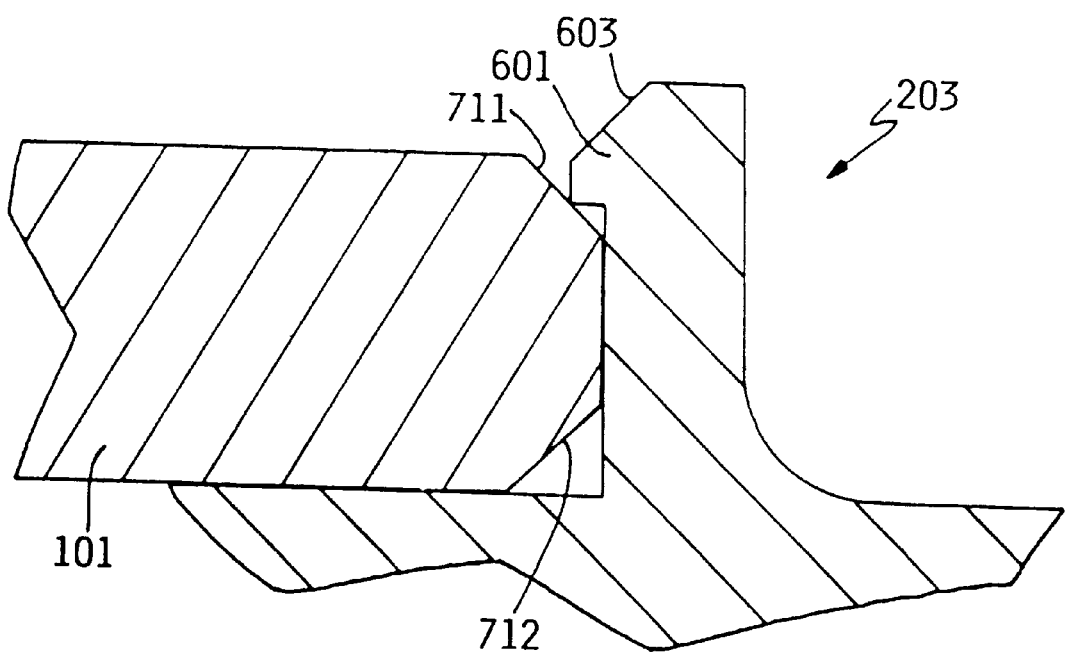
FIG. 7 is a sectional view of a clamping finger, showing how it clamps a disk in place, according to the preferred embodiment.

FIG. 7 is a sectional view of clamping finger 203, showing how it clamps disk 101 in place. Disk 101 and finger 203 are shown in cross-section in the plane of the disk axis.

Disk 101 preferably contains chamfered inner edges 711, 712, which are chamfered it at approximately a 45 degree angle. The chamfers make assembly of disk 101 to hub 103 easier, provide a surface for application of force from pawl 601, and help to center the disk.

Disk 101 is preferably assembled to hub 103 by positioning disk 101 over the fingers and pushing directly downward. When pushing downward, chamfered edge 712 on the bottom surface of disk 101 slides against chamfered edge 603 on the top surface of pawl 601. Because finger 203 is made from an elastic material, finger 203 retracts inward (toward the disk axis) as disk 101 is pushed down upon it, enabling the narrowest part of the disk center hole to clear the pawl. After the narrowest part of the disk center hole clears the pawl, the finger returns to near its original position due to the natural elasticity of the material. When the bottom surface of disk 101 rests upon flange 202, pawl 601 will be positioned as shown in FIG. 7, applying a force to chamfered edge 711.

Pawl 601 applies both a downward axial force and a radial force to chamfered edge 711. The downward axial force pushes disk 101 against the upper surface of flange portion 202, securely clamping disk 101 in place.

Because a plurality of circumferentially spaced fingers, all at the same radius from the disk axis, apply the same radial force to the chamfered inner edge 711 of the disk center hole, the disk is automatically centered about the axis as it is forced over the fingers and into its assembled position on the flange. Thus, there is no need for centering tools.

Preferably, finger 203 makes contact with the non-chamfered portion of the inner edge of the hole in disk 101, applying a slight radial force. Finger 203 acts as a non-linear beam spring. At rest with the disk in place, the radial force is small to avoid warping the disk. However, the radial force imparted by the finger increases at more than a linear rate if the finger is bent back (in the direction toward the disk axis). As a result, a much stronger force will oppose any movement of the disk from its proper position. The hub therefore achieves a high resistance to mechanical shock with a very low cost, simple design.

During drop testing, it was observed that the compliant fingers absorb a substantial part of the energy being transmitted by disk 101 to hub 103, thus preventing damage to the bearing systems. This feature is very desirable for portable media technology.

Warpage of disks is a well known problem in the disk drive art. A conventional clamp must exert considerable axial force on the clamped disk to ensure that the disk does not move. This force tends to warp the disk. It has been observed that the compliant clamping mechanism of the present invention achieves a secure clamping of the disk with virtually no warpage. Unlike conventional clamp designs, which typically use a metal clamp, the hub of the present invention is made from a compliant material which is preferably much softer than the disk itself. The surface of the compliant material deforms at the point of contact (i.e., the upper surface of flange portion 202 and fingers 203) with the disk, providing a relatively higher static coefficient of friction than is usually present with the metal-to-metal contact of a conventional disk clamp. Due to the higher coefficient of friction, the disk can be securely clamped using a smaller axial force. Additionally, because the disk material is substantially harder than the hub material, the hub surface rather than the disk surface deforms at the points of contact. The disk accordingly experiences very little local strain near the inner diameter, resulting in very low warpage as compared to a conventional disk.

Figure 8:
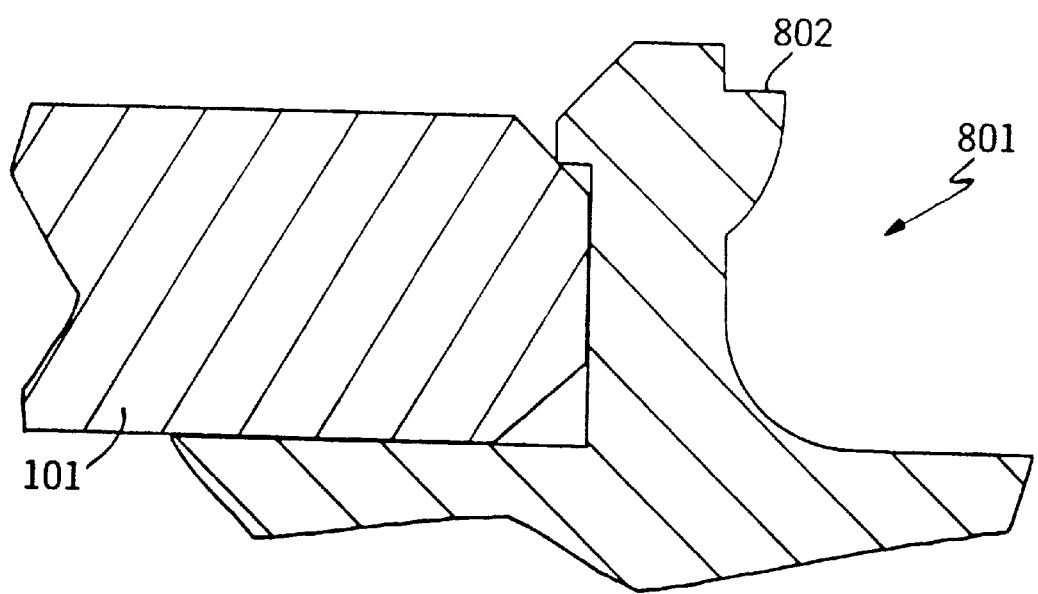
FIG. 8 is a sectional view of an alternate design for a clamping finger and disk.

The dimensions of finger 203 must be selected for the chosen hub material to provide suitable compliance of the finger, and to simultaneously provide sufficient clamping force when the disk is in place. In the preferred embodiment finger 203 is approximately 0.25 mm wide in the radial dimension, and 1 mm wide in the circumferential direction. The overall height of the finger is approximately 1 mm. It will be appreciated by those skilled in the art that optimal finger dimensions will vary depending on the qualities of the material. A stiffer hub material may require a thinner finger, and vice-versa. It will further be appreciated that the dimensions will vary depending upon the size and material of the disk itself. The dimensions given above for the preferred embodiment are intended for use with a 1.8" disk formed of an aluminum substrate, and having a thickness of approximately 0.635 mm, such as would be used for a PCMCIA Type II form factor. FIG. 8 is a sectional view of an alternate design for a clamping finger 801 and disk. The alternate clamping finger 801 of FIG. 8 is identical to clamping finger 203 described above and shown in FIGS. 1–7, except for the addition of a tab 802 projecting from the side of the finger facing the disk axis. Tab 802 provides a surface for engagement with a disk removal tool (not shown). To remove disk 101, the tool applies a downward force to tab 802, tending to bend finger 801 backward. At the same time, disk 101 is lifted from the flange portion 202 of hub 103. Removal of a disk is sometimes necessary during rework of a disk drive as part of the manufacturing and testing process.

In the preferred embodiment, the clamping means is a plurality of fingers extending from the upper surface of the flange and engaging the disk. However, any clamping means which is integrally formed with the hub may be used within the spirit and scope of the present invention. For example, the fingers might extend from some other portion of the hub, such as hollow cylindrical base portion 201. Fingers extending from some other portion, such as the cylindrical portion, might press down on the disk from above. Alternatively, the clamping means could be a deformable ring extending from the upper surface of the flange or from the hollow cylindrical portion, or a deformable ring broken at circumferentially spaced intervals for stress relief.

In the description above, certain features have been referred to as "above" or "below" the flange, and surfaces described as "upper" or "lower". These terms are used only for ease of reference and are consistent with the drawings and the normal orientation used in the art. However, the use of these terms is not meant to imply that the present invention requires the flange to be located below the disk and above the motor. The motor and disk drive of the present invention could just as easily be constructed with the flange located above the disk, or with the axis of rotation oriented horizontally.

Although a specific embodiment of the invention has been disclosed along with certain alternatives, it will be recognized by those skilled in the art that additional variations in form and detail may be made within the scope of the following claims.

What is claimed is:

1. A rotating disk data storage device, comprising:
   a disk drive base;
   a rotatably mounted disk for recording data, said disk having an axis or rotation and a circular aperture at its center for mounting said disk on a rotatable hub;
   a single-piece integrally-formed hub/clamp/rotor member for mounting said disk, said hub/clamp/rotor member being mounted for rotation about said axis, said hub/clamp/rotor member forming a rotor housing of a spindle motor rotor, said hub/clamp/rotor member comprising (a) a hollow cylindrical portion having an axis coincident with said axis of rotation of said disk, said hollow cylindrical portion surrounding a disk shaft and fitting within said circular aperture of said disk, (b) a support structure for supporting said disk including a flange portion extending outward from said hollow cylindrical portion, said flange portion supporting said disk, and (c) a clamp structure, said clamp structure locking said disk in place during operation of said rotating disk data storage device, wherein said clamp structure of said hub/clamp/rotor member comprises a plurality of circumferentially spaced fingers extending from said flange portion and engaging said disk;
   a set of rotor magnets attached to said rotor housing of said hub/clamp/rotor member;
   a spindle motor stator attached to said base for driving said rotor magnets;
   at least one transducer head for reading data stored on said disk; and
   a moveable actuator mounted on said disk drive base for positioning said transducer head to read data recorded on said disk.

2. The rotating disk data storage device of claim 1, wherein said hollow cylindrical portion of said hub/clamp/rotor member surrounds a set of bearings for mounting said hub/clamp/rotor member to said disk shaft.

3. The rotating disk data storage device of claim 1, wherein said set of rotor magnets is attached to said flange portion near the outer edge thereof, and said stator is positioned surrounding said disk shaft and between said disk shaft and said rotor magnets.

4. The rotating disk data storage device of claim 1, wherein said hub/clam/rotor member is an injection molded polymeric part.

5. The rotating disk data storage device of claim 1, wherein said disk is self-centered upon said hub/clamp/rotor member.

6. The rotating disk data storage device of claim 1, wherein said hub/clamp/rotor member is formed from a compliant material, said compliant material being substantially more compliant than said disk.

7. A hub/clamp/rotor member for a rotating disk data storage device having an in-hub spindle motor, comprising:
   a single-piece integrally-formed hub/clamp/rotor member for mounting a rigid disk, said rigid disk for recording data and having a circular aperture at its center for mounting said disk on said hub/clamp/rotor member, said hub/clamp/rotor member for mounting on a disk drive base for rotation about an axis, said hub/clamp/rotor member forming a rotor housing of a spindle motor rotor, said hub/clamp/rotor member comprising:

a hollow cylindrical portion having an axis coincident with said axis of rotation, said hollow cylindrical portion for surrounding a disk shaft and fitting within said circular aperture of said disk, a support structure for supporting said disk including a flange portion extending outward from said hollow cylindrical portion, said flange portion for supporting said disk, and a clamp structure, said clamp structure locking said disk in place during operation of said rotating disk drive data storage device, wherein said clamp structure of said hub/clamp/rotor member comprises a plurality of circumferentially spaced fingers extending from said flange portion, said fingers for engaging said disk.

8. The hub/clamp/rotor member for a rotating disk data storage device of claim 7, wherein said hub/clamp/rotor member is an injection molded polymeric part.

9. The hub/clamp/rotor member for a rotating disk data storage device of claim 7, wherein said disk is self-centering upon said hub/clamp/rotor member.

10. The hub/clamp/rotor member for a rotating disk data storage device of claim 7, wherein said hub/clamp/rotor member is formed from a compliant material, said compliant material being substantially more compliant than said disk.

* * * * *

UNITED STATES PATENT AND TRADEMARK OFFICE
CERTIFICATE OF CORRECTION

PATENT NO. : 6,556,376 B1  Page 1 of 1
APPLICATION NO. : 09/094067
DATED : April 29, 2003
INVENTOR(S) : Zine-Eddine Boutaghou It is certified that error appears in the above-identified patent and that said Letters Patent is hereby corrected as shown below:

In column 8, claim 5, line 2 change "self-centered" to --self-centering--

Signed and Sealed this

Twenty-fourth Day of June, 2008

JON W. DUDAS
*Director of the United States Patent and Trademark Office*